Oct. 10, 1944.  G. W. RUDA ET AL  2,360,281
DEVICE FOR FEEDING LIQUIDS TO CENTRIFUGAL SEPARATORS
Filed March 4, 1943  3 Sheets-Sheet 3

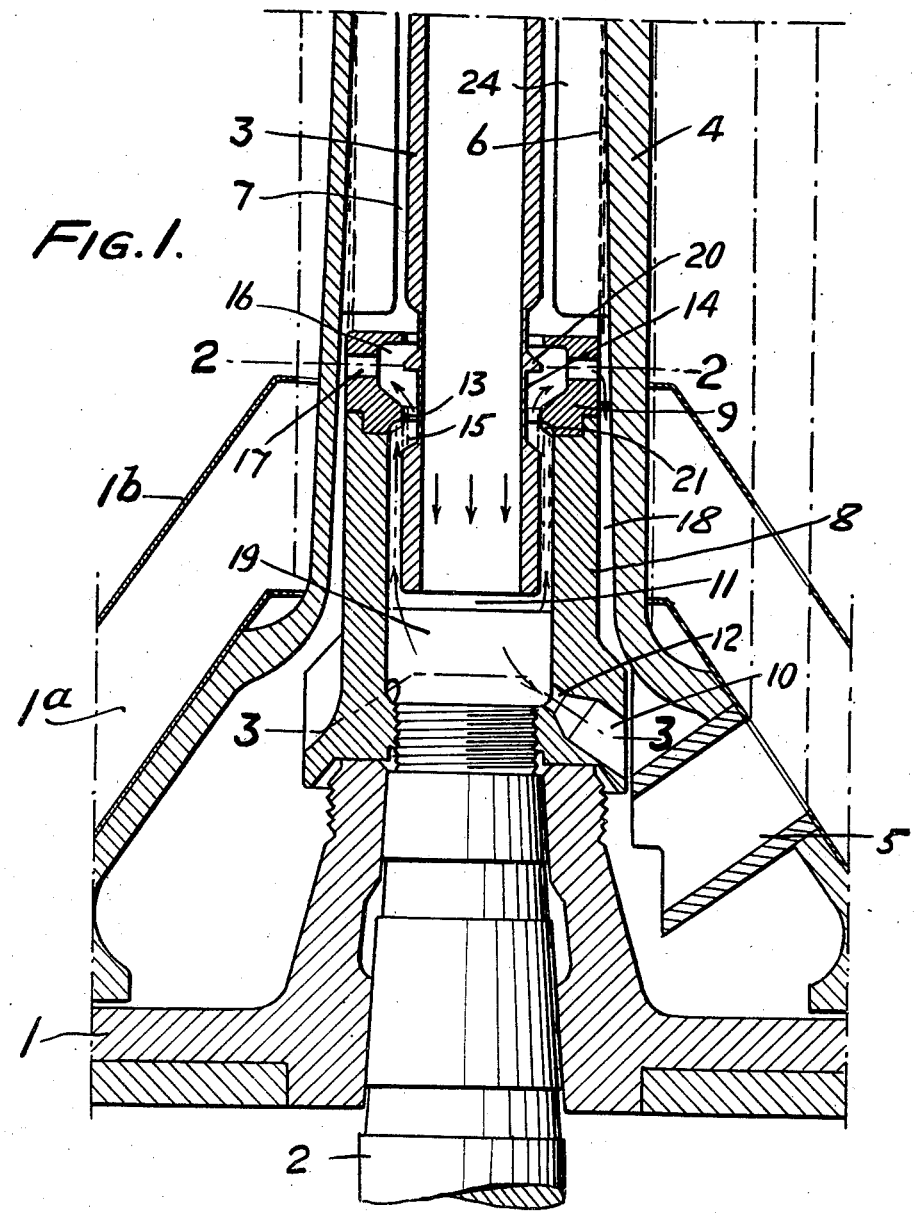

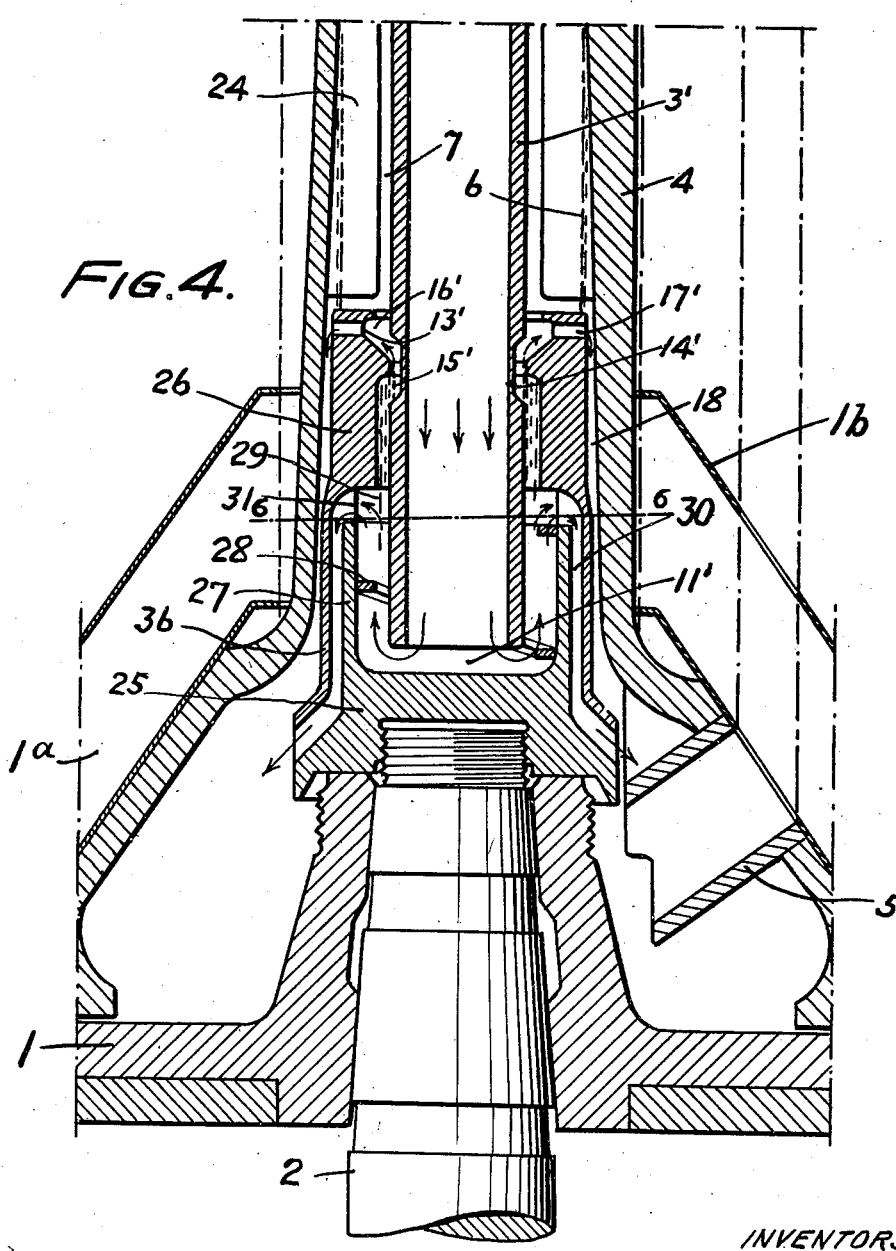

WITNESS:

INVENTORS
Gustaf Wilhelm Ruda
Stig Holger Bjarne Zachariassen
BY Busser and Harding
ATTORNEYS.

Patented Oct. 10, 1944

2,360,281

UNITED STATES PATENT OFFICE 2,360,281

DEVICE FOR FEEDING LIQUIDS TO CENTRIFUGAL SEPARATORS

Gustaf Wilhelm Ruda and Stig Holger Bjarne Zachariassen, Stockholm, Sweden, assignors to The De Laval Separator Company, New York, N. Y., a corporation of New Jersey Application March 4, 1943, Serial No. 477,914
In Sweden March 21, 1941

12 Claims. (Cl. 233—45)

Experience has shown that liquids, such as milk in which the butter fat is contained in the form of globules of fluid or solid consistency coated with a slime-like protective film, are rendered more difficult to separate when air is mixed with them. Milk mixed with air also forms a greater proportion of froth when it is subjected to working. For these reasons it is highly desirable, where milk is to be subjected to separation into skim milk and cream, or is to be otherwise worked, or when handling other liquid mixtures, to avoid admixture of air therewith.

The admixture of air most often occurs at those places where a partial vacuum is formed in the milk relative to the surrounding atmosphere; for instance, because the milk is brought into flow. If the air can thereby enter freely, the vacuum is equalized by air, which subsequently is dissolved in the milk. The suction side of a milk pump, for instance, may leak, allowing air to be sucked in.

In supply devices for centrifugal separators the same problem occurs. The liquid being supplied freely through a stationary spout must be brought into rotation with the bowl. This is generally effected by means of a wing system which receives the liquid. The said wing system more or less acts as the pump wheel of a centrifugal pump as it throws the liquid towards the periphery, the construction thereby allowing considerable leakage of air on the suction side. The liquid being supplied to the separating chamber is thereby mixed with a considerable amount of air.

The desirability, in centrifugal separators, of avoiding admixture of air with milk has long been recognized and different arrangements have been devised having for their object the conveyance of the milk to the separating bowl without impact and without mixing air therewith. For example, one known arrangement comprises a chamber enclosing the feed spout as closely as the necessary play permits. The chamber is provided with some form of wings and/or channels that receive the milk and conduct it to the liquid level in the distributor of the bowl. Such arrangements reduce the splitting up of the fat, but are not entirely efficient, since a certain amount of air is sucked in, which is due to the fact that the chamber is not filled with liquid below and around the spout. If, for instance, the pumping effect of the wing system is increased, a larger amount of liquid cannot be made to stream out of the spout, but this expedient will only result in more air being sucked with the liquid. Even if the spout is surrounded by a protective ring of liquid, the partial vacuum which is formed by the wings under the spout will allow the air to break through the said ring.

Any arrangement like that described thus aims at maintaining a ring of liquid between the spout and the wall of the chamber enclosing the spout, which ring excludes the air. As the spout should be introduced into the chamber through its side opening when the centrifuge is to be assembled, the ring of liquid must be bounded by a free liquid surface extending from the inlet pipe to the edge of the inlet opening, which is positioned on a somewhat greater radius. The possibility of maintaining such a liquid surface is so far present that the liquid adhering to the spout is braked by the same, whereas that part of the liquid which adheres to the wall of the chamber is brought into rotation with the wall owing to the friction. That part of the liquid forming the liquid surface which is closest to the spout is therefore less influenced by the centrifugal force than that part of the liquid which forms the part of the liquid surface lying closest to the wall of the chamber, the result of which is that the liquid surface does not become cylindric but instead gets a larger radius at the wall of the chamber than at the spout. The required play between the spout and the wall of the chamber can in this way be bridged over.

The formation and maintenance of the said free liquid surface during operation is, however, also dependent on the pressure in the ring of liquid. The object of our invention is to provide a construction or arrangement by means of which the right degree of pressure is obtained. In such an arrangement, which is adapted for use in a centrifugal bowl in which a stationary supply spout projects into a chamber rotating with the bowl, from which chamber the liquid is conducted into the separating chamber through channels, the said channels, the amount of liquid supplied, the rotation speed of the centrifugal bowl, and the pressure in the liquid at the outlet of the channels, are so determined relative to each other that the required free surface of liquid is maintained between the inlet spout and the inner wall of the chamber during operation.

The desired effect may be reached by suitably constructing the said outflow channels, or by regulating the rotation speed of the centrifuge or the amount of liquid being fed into it. The latter factors are generally given, and the invention may therefore in practice best be carried into effect by suitably dimensioning the channels with regard to their resistance to the flow of the liquid, by regulating the sliding to which the liquid is subjected when it is passing to the separating chamber, or by providing wings of a given angle of inclination and shape which, when they move relative to the liquid, exert a pressure thereon.

In the drawings, which shoe different specific constructions embodying our invention—

Fig. 1 is a vertical section through that part of a centrifugal separator comprising one embodiment of our improved feeding contrivance and the immediately surrounding part of the separator bowl.

Fig. 4 is a vertical sectional view, similar to Fig. 1, of another embodiment of our invention.

Figure 2:
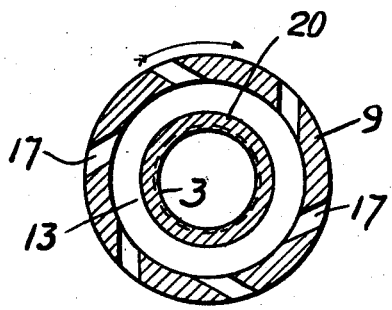
Fig. 2 is a section on the line 2—2 of Fig. 1.

Referring, first, to the construction shown in Fig. 1:

The centrifugal bowl 1 is supported on the spindle 2. 3 is the stationary feed tube, or inlet spout, and 4 the distributor, with which, through the receiver hereinafter described, the feed tube communicates and which communicates with the separating chamber 1a of the bowl. In the distributor are conveying wings 24. In the separating chamber are the usual pile of discs 1b, of which two are shown, provided with the usual aligning orifices registering with supply tubes 5 from the lower part of the distributor.

6 denotes the level of the liquid in the distributor and 7 the air space inside such level.

Within the distributor and surrounding the lower part of the inlet spout and extending below the same is a receiving device 8—9 for the liquid discharged from the spout. This receiving device may be made in a unitary piece, but to facilitate manufacture we prefer to make it in two parts: a lower part 8, which is also used as a cap nut, and an upper part 9. From the chamber 11, enclosed by the part 8 of the receiving device, extend outlet channels 10, which have a contracted portion 12 of a size to pass the definite quantity of liquid, for which the bowl is designed, with the definite pressure that will be generated by centrifugal force acting on a column of liquid from the radius of the inside of the flange 13 to the radius of the outside of the wall 8 as shown at the level of the bottom of the feed tube when rotating at the speed for which the bowl is designed.

The inlet spout or regulating tube 3, while of uniform internal diameter, has a relatively thick lower end and a relatively thin or turned-in neck 14 connecting the thick lower end of the tube 3 with its upper portion. The wall of the receiving device 8—9 is spaced from the feed tube, forming between them an annular chamber. The upper member 9 has, extending toward the neck 14, an inwardly extending annular flange 13 whose inner diameter is barely larger than the outer diameter of the enlarged lower end of the tube 3 so as to permit passage of the latter's enlarged end when assembling the parts. Thereby is formed a throttled portion inside the flange 13. Above this throttle 13 is a chamber 16 which, through channels 17 in the member 9 of the receiving device, communicates with the annular channel 18 of the distributing chamber, formed between the latter's enclosing wall and the outer wall of the receiving device 8—9.

If the throttles 12 of the channels 10 were not provided, the channels would be too large for the quantity of liquid leaving the inlet spout 3. The chamber 11 would, therefore, partly be filled with air that would be sucked through the channels 10. By providing the throttles 12 the resistance to the flow of the liquid becomes great enough to necessitate or create a pressure in the chamber 11 in order to force therethrough the amount of liquid supplied thereto. A liquid level 15 will thereby be formed in the receiving arrangement. The position of the level depends on the conditions of pressure of the liquid in the receiving device. The level will start at the spout and extend to the inner wall of the receiver arrangement, thus protecting the outlet channels for the liquid from admixture of air. Owing to the retarding action of the stationary part (that is, the inlet spout), the position of the level where it contacts with the said part must be closer to the center than is the case at the wall of the receiver arrangement where the conveying of the liquid is complete. Thus, even if the spout is completely centered relative to the receiver arrangement, the level need not extend inside the edge 13, even if it touches the spout. If the pressure required in the receiver arrangement becomes sufficiently high, the level 15 will, however, extend inside the edge 13 and liquid will leak into the chamber 16 in the part 9 and flow through channels 17 and 18 to the liquid being fed into the separating chamber. With a view to reducing the amount of liquid leaking out, several edges may be arranged above each other and corresponding annular grooves in the supply spout, a labyrinth-like tightening thus being obtained round the spout. The pump wing 19 in the chamber 11, which is propeller-shaped (see Fig. 3) in order to reduce the impact action, has a sucking effect on the liquid leaving the spout.

A flange 20 arranged in the reduced section 14 of the inlet spout breaks a jet of liquid if it should be sprayed upwards and conducts it out into the chamber 16. The outer diameter of the flange should be the maximum permitted by the necessity of passing the inlet spout through the upper opening of the receiving arrangement. Wings 21, arranged below the flange 13, effect complete conveyance of the liquid flowing over the edge of the flange and thereby resist leakage out of the liquid.

The upper end of the bowl spindle 2 constitutes the bottom of the chamber 11, so that cleaning can be effected, when the centrifuge is removed from the spindle, through the bottom hole in the receiver arrangement, which is, as shown, threaded to receive the spindle.

Figure 3:
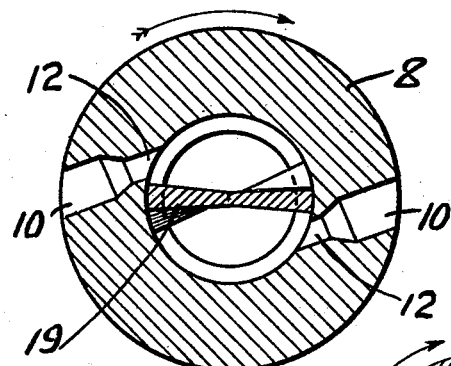
Fig. 3 is a section on the line 3—3 of Fig. 1.

The laterally extending channels 17, connecting the chamber 16 and the annular channel 18, may advantageously be bent backwards, relative to the direction of rotation, from radial lines as illustrated in Fig. 2, which shows a cut through part 9 at the level of the channels 17. The channels 10, connecting the chamber 11 with the distributor 4, may also extend in a direction deviating from that of the radius in order to avoid unnecessary curves in the path of the liquid. The channels 10 should advantageously have a round section, and the throttles should be bored or given exact dimensions in another way, so that the desired strength of current is obtained therein. Fig. 3 illustrates a transverse cut through the channels 10 of the receiver arrangement.

The embodiment of the invention shown in Fig. 4 comprises elements (1, 1a, 1b, 2, 4, 5, 6, 7, and 18) the same as in Fig. 1 and elements 3', 14', 11', 13', 15', 16', 17' similar or equivalent to elements 3, 14, 11, 13, 15, 16, 17, respectively, of Fig. 1. The receiver arrangement, which comprises upper and lower parts 25 and 26, differs from that shown in Fig. 1 by the fact that the whole quantity of liquid is forced to flow in one direction from the end of the spout by means of the cylindrical element 27 forming part of the receiver element 25. The inside of the cylinder is provided with a spiral or spirals 28 whereby a possible partial vacuum at the delivery end of the spout is converted to a pressure in the chamber 29 just above the upper end of the cylinder 27. The liquid is conducted from chamber 29 through closed channels 30 between the outer wall of cylinder 27 and the inner wall of a skirt 36 depending from and forming part of the upper receiver element 26. Thence the liquid is conducted to the bulk of liquid contained in the distributor 4. Above the chamber 29, the construction of the receiver arrangement is substantially the same as in Fig. 1, and its operation and function are the same.

In the arrangement according to Fig. 1 the throttles 12 retard the flow of the liquid, so that the receiver is kept filled with liquid. In the arrangement shown in Fig. 4 it is, of course, also possible to provide, in channels 30, throttles similar to and for the same purpose as those shown at 12 in Fig. 1. However, in this case another arrangement which could also, if desired, be used with other parts of the construction shown in Fig. 1, is believed preferable. If the wings 31, which form the partitions between the several channels 30, are omitted, the liquid will flow downward in a single annular passage. Because, in its outward and downward flow, the liquid is accelerated by only the friction of the smooth surrounding walls, its rotational velocity will be substantially less than that of the bowl. The pressure due to centrifugal force will therefore be much less than if rotating at full speed as in the channel 18. To compensate for this and provide the pressure necessary to feed liquid into the bowl, the inner surface of the liquid in the chamber 29 will have to be much nearer the center than the surface shown at 6. If, instead of omitting the wings 31 completely, only part is omitted, an intermediate condition will be obtained.

By properly proportioning the wings 31 and passages 30 to other parts of the bowl and the rate of feed therethrough, the inner surface of the liquid, in chamber 24 and the space above it, can be controlled at the level 15' as shown and mixture of air with the liquid will be prevented.

Figure 5:
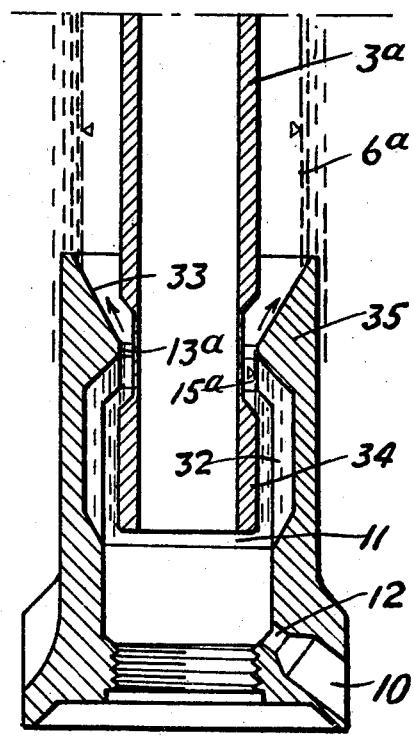
Fig. 5 is a vertical section, through the lower part of the feed tube and distributor, of a modification of Fig. 1.
Figure 6:
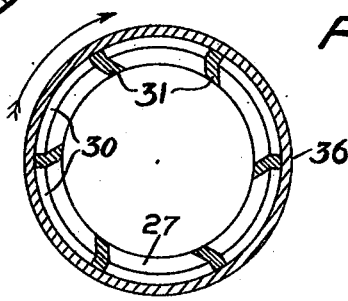
Fig. 6 is a section on the line 6—6 of Fig. 4.

In the modification shown in Fig. 5, the elements 10, 11 and 12 are the same as the elements 10, 11 and 12 of Fig. 1. Elements 3a and 13a correspond to elements 3 and 13 of Fig. 1. Liquid levels 6a and 15a correspond to liquid levels 6 and 15 of Fig. 1. The area of the opening 12 should accurately correspond to the capacity and the speed of rotation and the pressure exerted on the liquid at the outlet of the channels, so that the amount of liquid flowing out this way is sufficient to insure that air is not sucked in along the outer wall of the inlet spout 3a; or, in other words, the level 15a should be kept close to the throttle 13a. In practice, therefore, it is sometimes necessary to make the constricted openings 12 so narrow that a small amount of liquid escapes over the throttle 13a. In order to avoid admixture of air with such escaping liquid, the outer end of the part 35 is made of conical shape, so that the liquid escaping thereover moves in a thin layer along the conical surface 33 from the throttle 13a to the liquid level 6a, which forms the inner boundary of the bulk of liquid contained in the bowl. If possible, the level 6a should lie on the conical surface 33 some way inside its outer circumference in order that admixture of air may be avoided.

The space between the lower part 34 of the spout and the part 35 may advantageously be continued in direction outwards by pockets formed by a number of conveyor wings 32 arranged on the inner wall of the part 35. In this way it is insured that the liquid at the level 15a close to the throttle 13a fully participates in the rotation of the bowl. As, on the other hand, the flow of liquid is retarded by the wall 34 owing to the friction, the liquid exerts an inwardly directed pressure on the wall 34 due to the reduced centrifugal force and therefore tightly contacts with the said wall, so that any leakage of the air this way is safely avoided, as long as the level 15a is located close to the throttle 13a. Even if the spout should be slightly eccentric, the tight joint will be maintained.

What we claim is:

1. In a centrifugal separator comprising a centrifugal bowl and its separating chamber, a distributor rotating with the bowl and within and communicating with the separating chamber, a stationary central feed tube within the distributor, a receiver surrounding and spaced from the feed tube and surrounded by and spaced from the distributor, said receiver having a chamber adapted to receive liquid from the feed tube, and a channel for flow of liquid from the receiver chamber into the distributor, there being an annular passage, above said channel, between the feed tube and the receiver, through which a part of the liquid delivered by the feed tube is adapted to flow upward, the upper part of said passage communicating with the distributor; means for preventing admixture of air with liquid flowing into the separator, said means characterized by the fact that the lower end portion of the feed tube, forming with the receiver the lower part of said annular passage, is of greater outer diameter than the outer diameter of the portion of the feed tube above such lower end, and a flange extending inward from the wall of the receiver into said annular passage and below its upper end and opposite said portion of the feed tube of smaller outer diameter, the inner diameter of said flange being substantially only sufficiently greater than the outer diameter of the lower end portion of the feed tube to allow the latter to pass through the flange in assembling.

2. A centrifugal separator as defined in claim 1 in which the said channel comprises a hole in the wall of the receiver having a contracted inlet end.

3. A centrifugal separator as defined in claim 1 in which said channel comprises a hole in the lower part of the receiver chamber extending at an angle to the radius of the separator and provided with a contracted inlet end.

4. A centrifugal separator as defined in claim 1 in which said receiver comprises a lower member having an upwardly extending cylinder surrounding and spaced from the lower end of the feed tube and an upper member having a depending skirt surrounding and spaced from the cylinder and surrounded by and spaced from the wall of the distributor, thereby forming the channel, specified in claim 1, for feed of liquid from the receiver chamber to the distributor, the specified channel construction constraining the liquid to flow upward between said cylinder and feed tube and thence downward between said cylinder and skirt, and a spiral on the inside of the cylinder in the part of the channel between the feed tube and cylinder.

5. A centrifugal separator as defined in claim 1 in which lateral channels through the wall of the receiver afford said communication between the upper part of said annular passage above said flange and said distributor.

6. A centrifugal separator as defined in claim 1 in which lateral channels through the wall of the receiver afford said communication between the upper end of said annular passage and said distributor, said channels extending at an angle to the radius of the separator.

7. A centrifugal separator as defined in claim 1 in which said channel comprises a hole in the wall of the receiver having a contracted inlet end, and a propelling device in the receiver chamber below the delivery end of the feed tube and above said outlet hole to the distributor.

8. A centrifugal separator as defined in claim 1 in which the flange extending inward from the wall of the receiver has a conical upper face over which any liquid escaping along said passage flows in a film upward and outward toward the distributor.

9. A centrifugal separator as defined in claim 1, comprising also wings, acting as conveyors, in said annular passage below said annular flange.

10. In a centrifugal separator comprising a centrifugal bowl and its separating chamber, a distributor rotating with the bowl and within and communicating with the separating chamber, a stationary central feed tube within the distributor, a receiver surrounding and spaced from the feed tube and surrounded by and spaced from the distributor, said receiver having a chamber adapted to receive liquid from the feed tube, and a channel for flow of liquid from the receiver chamber into the distributor, there being an annular passage, above said channel, between the feed tube and the receiver, through which a part of the liquid delivered by the feed tube is adapted to flow upward, the upper part of said passage communicating with the distributor, a flange extending inward from the wall of the receiver into said passage, the feed tube opposite said flange having an outer diameter less that that of its lower end, the inner diameter of said flange being substantially only sufficiently greater than the outer diameter of the lower end of the feed tube to allow the latter to pass through the flange in assembling, said receiver comprising a lower member having an upwardly extending cylinder surrounding and spaced from the lower end of the feed tube and an upper member having a depending skirt surrounding and spaced from the cylinder and surrounded by and spaced from the wall of the distributor, thereby forming the channel, hereinbefore specified, for feed of liquid from the receiver chamber to the distributor.

11. A centrifugal separator as defined in claim 10 in which the annular passage therein specified extends upward from the upwardly extending part of the channel between the feed tube and said cylinder.

12. In a centrifugal separator comprising a centrifugal bowl and its separating chamber, a distributor rotating with the bowl and within and communicating with the separating chamber, a stationary central feed tube within the distributor, a receiver surrounding and spaced from the feed tube and surrounded by and spaced from the distributor, said receiver having a chamber adapted to receive liquid from the feed tube, and a channel for flow of liquid from the receiver chamber into the distributor, there being an annular passage, above said channel, between the feed tube and the receiver, through which a part of the liquid delivered by the feed tube is adapted to flow upward, the upper part of said passage communicating with the distributor, a flange extending inward from the wall of the receiver into said passage, the feed tube opposite said flange having an outer diameter less than that of its lower end, the inner diameter of said flange being substantially only sufficiently greater than the outer diameter of the lower end of the feed tube to allow the latter to pass through the flange in assembling, the upper part of said passage being enlarged to form an annular chamber, there being lateral channels through the wall of the chamber connecting said annular passage with the distributor, and a flange on the feed tube extending into said chamber.

GUSTAF WILHELM RUDA.
STIG HOLGER BJARNE ZACHARIASSEN.